Feb. 6, 1940. C. E. BRODERS Re. 21,341

AUTOMATIC FEED HEAD

Original Filed May 3, 1933

INVENTOR
Claude E. Broders
BY
Arthur M. Smith
ATTORNEY

Reissued Feb. 6, 1940 Re. 21,341

UNITED STATES PATENT OFFICE 21,341

AUTOMATIC FEED HEAD

Claude E. Broders, Detroit, Mich., assignor, by mesne assignments, to Victor Gauvreau, Detroit, Mich.

Original No. 2,053,514, dated September 8, 1936, Serial No. 669,226, May 3, 1933. Application for reissue May 11, 1938, Serial No. 208,372

7 Claims. (Cl. 77—33)

My invention relates to a feed head and more particularly to a centrifugally operated feed head adapted for use in connection with cutting, milling, reaming, or drilling operations in which the particular tool to be employed is rotating while advancing toward the object to be worked upon. As a further feature of my invention the tool is returned automatically to its initial position after being moved to a predetermined point.

Prior to my invention automatic feed heads have been proposed in which fluid pressures or mechanically operated cams and levers have been utilized to cause a movement of a tool toward the object to be worked upon. In order to use such devices as a part of an automatic machine, it is necessary to provide means for operating the feed head in addition to power means for driving the tool. This requirment adds greatly to the expense of such machines and greatly lessens the utility of such devices in automatic machine work.

Mechanically operated feed heads heretofore known have been unsatisfactory also due to excessive breakage of tools when encountering a "hard spot" in the work. The increased resistance to the tool builds up such pressures that breakage of the tool results.

Devices heretofore proposed in which centrifugal force is utilized to move a rotating tool have been adaptations of the conventional ball and lever type of mechanism commonly employed as governors in various types of machines. I have found that it is not feasible to utilize this type of mechanism in a feed head device. A device of this type is known to lose its efficiency the further the rotation throws the weighted balls. As the balls move to the positions farthest removed from their positions of rest, the effective lengths of the connected levers are shortened and consequently the pressures exerted on the tool are diminished. In contrast to this effect, a device embodying my invention shows an approximately constant pressure exerted on the tool at all times.

It is, therefore, an object of my present invention to provide an automatic feed head in which centrifugal force is used to advance a tool, the forces utilized being built up by the power means utilized for operation of the tool.

It is a further object of my present invention to provide an automatic feed head in which adjustable automatic means are provided to return the tool to its initial position after its advance to a predetermined point.

It is a further object of my present invention to provide an automatic feed head in which forces exerted by the feed head may be definitely controlled and varied to meet the requirement of different types of materials and different operations to be performed thereon.

It is a further object of my present invention to provide an automatic feed head in which predetermined and approximately constant pressures are exerted on the tool actuated by the feed head.

It is a further object of my present invention to provide an automatic feed head which is of such a design and construction as to be inexpensive to manufacture, positive in operation, and adapted for convenient utilization in all types of automatic machines in which it is desired to advance a rotating tool to a predetermined point, and then automatically return the tool to its initial position.

These and various other objects, features of arrangement, construction and operation, are plainly shown and described and will be best understood by reference to the accompanying drawing, in which.

Similar reference numerals refer to similar parts throughout the several views.

Figure 1:
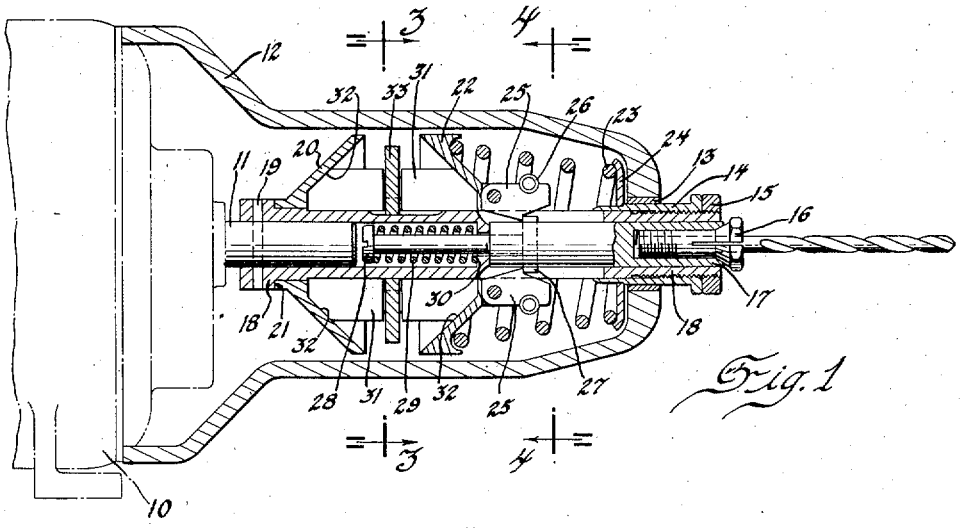
Fig. 1 is a longitudinal, sectional view of a feed head embodying my invention, mounted on the shaft of an electric motor partially shown in side elevation.

Referring more in detail to the drawing, and particularly to Fig. 1, 10 designates a conventional type of electric motor having a rotating shaft 11 and is here utilized only as a symbol of a prime mover and a shaft driven by the prime mover, inasmuch as my invention is adapted for use with any shaft which may be rotated by any preferred means.

In the present embodiment of my invention a housing 12 is provided, one end of which abuts upon and is supported by the casing of the motor 10, and the opposite end of which is provided with a bushing 13 through which extends an adjustable latch release sleeve 14, which is secured in any desired position by a lock nut 15.

Tool holding means 16 of any desired type are secured to a driven plunger 17, which extends through the drive sleeve 18 on which the adjustable latch release sleeve 14 is screw-threaded. The drive sleeve 18 is locked on the shaft 11 for rotation therewith by a key 19 or other suitable means. Secured to the drive sleeve 18 is a fixed member 20, which abuts on a shoulder 21 provided in the drive sleeve 18. A push member 22 is mounted on the drive sleeve 18 at a distance from the fixed member 20 and is so mounted as to be free for reciprocal longitudinal movement relative to the drive sleeve 18.

A main spring 23 abuts at one end against the push member 22 and at the other end abuts against a spring stop washer 24. A plurality of plunger latch members 25 are pivotally mounted on the end of the push member 22 which extends inside the main spring 23. A latch spring 26 extends around the plurality of latch members 25 and yieldingly holds said latch members in the position shown in Fig. 1. A plunger pin 27 is secured to the driven plunger 17 at a suitable point to be contacted by said plurality of latch members 25. The plunger pin 27 is locked in position in the driven plunger member 17 by a plunger screw 28. A plunger spring 29 abuts at one end against the head of the plunger screw 28 and at the other end against a shoulder 30 formed inside the drive sleeve 18, and acts to return the driven plunger 17 after completion of its forward movement.

Movement of the driven member 22 and its attached parts to cause a movement out of the casing 12 of the driven plunger 17 is accomplished by a plurality of separate actuating weights 31, which occupy the space between the fixed member 20 and the driven member 22. The said actuating weights 31 are mounted concentrically about the drive sleeve 18, and when the drive sleeve 18 is not rotated occupy the position shown in Fig. 1 lying closely adjacent to the outer surface of the drive sleeve 18.

The actuating weights 31 are each formed with beveled cam faces 32, which lie adjacent to cam surfaces provided on the fixed member 20 and the actuating member 22. Rotation of the drive sleeve 18 builds up centrifugal forces within the weights 31 and causes the weights 31 to move outwardly from said drive sleeve 18. In order to insure positive direction in the outward travel and subsequent return of the weights 31, a weight spacing and guiding member 33 is provided. The weight spacing and guiding member 33 is mounted on the drive sleeve 18 and is preferably splined thereon to insure positive rotation therewith without limiting free longitudinal movement relative thereto.

The operation of a device embodying my invention is as follows:

Prior to the rotation of the shaft 11 the parts occupy the position shown in Fig. 1. In referring to this relation of the parts I shall hereafter use the term "parts at rest".

When the parts are at rest the actuating weights 31 occupy a position concentric with and closely adjacent to the drive sleeve 18. The spring 23 exerts an approximately constant pressure on the push member 22, which pressure in turn is exerted on the actuating weights 31 and yieldingly maintains the said weights in this position. While the parts are at rest the driven plunger 17 is maintained within the drive sleeve 18 and the drive pin 27 is contacted by the latch members 25. Upon rotation of the shaft 11 the weights 31 begin to move outwardly from the drive sleeve 18 until they occupy the position shown in Fig. 2. As the shaft is rotated, the drive sleeve 18 and the driven plunger 17 are also rotated and the tool held in the tool holding means 16 is caused to rotate. At the same time the fixed member 20 and the push member 22 both are rotated at the same speed as the driven sleeve 18. As the weights 31 move outwardly from the sleeve 18 due to this rotation, the cam surfaces 32 slide along the cam surfaces on the members 20 and 22.

The shape of the cam surfaces on the members 20 and 22 is such that the distance which separates the members is less at their outer circumferences than at their points of attachment to the drive sleeve 18. Thus, as the weights 31 move outwardly pressures are exerted on the members 20 and 22, tending to cause relative longitudinal movement of the member 22. The member 20 is fixed to the sleeve 18 and abuts on the shoulder 21, so that it cannot move in a longitudinal direction. The longitudinal movement of the member 22 compresses the spring 23 and this takes place as soon as sufficient forces are built up in the weights 31 to overcome the forces present in the spring 23 and the inertia forces in the plunger 17 and its related parts.

Figure 2:
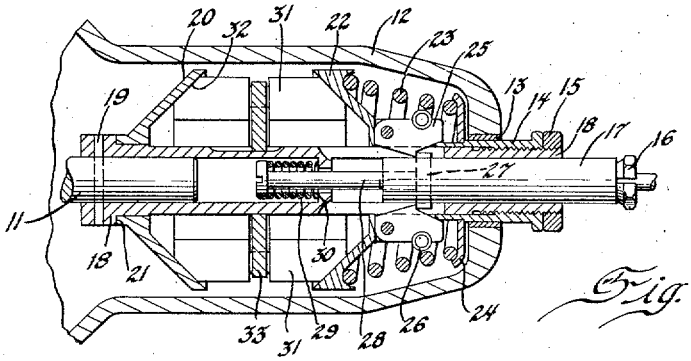
Fig. 2 is a fragmentary section of a feed head embodying my invention, showing the positions of the respective parts after movement of the tool a predetermined distance.

As the member 22 moves longitudinally, the latches 25 exert a pushing action on the plunger pin 27, which in turn pushes the plunger 17 causing it to move longitudinally relative to the sleeve 18. This movement compresses the spring 29 and is continued until the plunger 17 has moved a predetermined distance, which is regulated by the latch release sleeve 14. Fig. 2 illustrates the position of these parts at the end of the predetermined longitudinal movement of the plunger 17.

Further rotation of the shaft 11 after the parts occupy the position shown in Fig. 2 continues the rotation of the drive sleeve 18 and forces the latches 25 forwardly to a point of contact with the end of the latch release sleeve 14. This opens the latches 25 against the pressure of the spring 26 and releases the plunger pin 27. Upon release of the plunger pin 27, the spring 29 is freed from compression and returns to its initial position, carrying with it the driven shaft 17 and its related parts. This return of the driven shaft 17 by the action of the spring 29 is independent of the return of the other parts of the assembly and permits a rapid withdrawal of the tool from the work while the tool is rotating under power.

The point of release of the pin 27 may be varied by adjustment of the latch release sleeve 14, and so it is possible to control positively and automatically the point at which forward movement of the tool shall cease. The return of the tool is practically instantaneous and may be accomplished without requiring a stopping of the shaft 11 or the driven sleeve 18.

After the driven plunger 17 is returned to its initial position, rotation of the shaft 11 and the driven sleeve 18 may be slowed down or stopped. As soon as the speed of rotation is lessened the forces in the weights 31 are lessened and the spring 23 is permitted to give up its compression and return to its initial position.

The forces in the spring 23 are exerted on the member 22 and bring about its return to its initial position. This return of the member 22 to its initial position forces the weights 31 toward their initial positions adjacent the driving sleeve 18. The weights 31 are guided by the spacing and guiding member 33 and so return to occupy the same position after operation as they did prior to operation of the feed head. The return of the member 22 to its initial position carries with it the latch members 25 which are caused to snap into place in operating contact with the plunger pin 27.

While the preferred method of operation of a device embodying my invention requires a stopping of the shaft 11 and the driven sleeve 18 to permit the return of the parts to their normal positions, it is possible to so relate the initial positions of the weights and the strength of the spring 23 that the parts may be returned to the initial position merely by retarding the speed of rotation of the shaft 11 and the driven sleeve 18 without entirely stopping the rotation of the shafts.

In the preferred embodiment of my invention here shown and described, I propose to use six separate weights 31. Any number of these weights may be used as long as they are radially disposed relative to the drive sleeve 18 and are so placed as to give a balanced rotation of the sleeve 18. I have found that by using six weights of this type it is possible to dispose them on opposite sides of the sleeve 18 and to use them in multiples of two, three, or four as well as the complete number of weights in order to secure different pressures on the tool. This arrangement will permit four possible variations in pressures on the tool and will be found to be sufficient in the majority of operations in which such a device is used. If more variation is desired, the number of weights may be increased and the selective removal of such weights will give the desired variations in pressures exerted on the tool.

Figure 3:
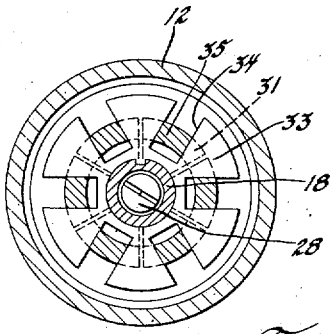
Fig. 3 is a sectional view taken on the line 3—3 of Fig. 1.
Figure 4:
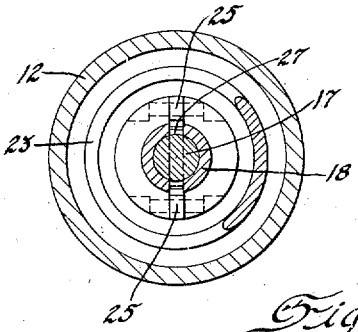
Fig. 4 is a sectional view taken on the line 4—4 of Fig. 1.

Each weight is spaced and guided by the member 33, which as shown in Fig. 3 is provided with a plurality of U-shaped grooves 34 corresponding in number to the number of weights 31 to be used in the device. Each weight 31 is formed with a central portion 35, which fits in one of said U-shaped grooves 34 for sliding movement relative thereto. Removal of any of the weights from the assembly is accomplished by the removal of the casing 12 and movement of the member 22 by compression of the spring 23. The desired weight or weights may then be slid from the member 33 from opposite sides of the drive sleeve 18, the remaining weights being maintained in their respective positions after release of the spring 23 and the return of the member 22 to its initial position by the member 33.

It will be observed that if resistance to movement of the tool is encountered the effect of that resistance is to lessen the speed of the tool without building up any added pressures on the tool. Thus a feed head embodying my invention eliminates much of the excessive tool breakage caused by feeding devices in which the pressure on the tool is increased as the resistance to the tool increases.

It will be found that if the feed head is constructed as shown in the drawing, the force caused by the centrifugal action of the weights 31 urging the cup 22 forward, will increase a certain fixed amount for each unit of linear distance that the drill is moved and that the force of the spring 23 opposing such movement increases at substantially the same rate, so that the initial difference between these forces remains substantially constant during the operation. The force exerted on the tool is only the difference between these forces, and thus there is a substantially constant feeding pressure on the tool during the entire feeding operation.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States is:

1. A feed head for feeding a rotating tool to a work piece at a predetermined substantially constant pressure and rate and comprising a body portion, a shaft rotating therein, a sleeve mounted on said shaft, a fixed member and a push member carried by said sleeve, a plurality of centrifugally actuated weights maintained between said members and movable outwardly thereof upon rotation of said shaft to effect sliding movement of said push member on said sleeve, a tool holder carried by said sleeve and slidable longitudinally thereof, a releasable connection between said push member and said tool holder and comprising pivoted dogs carried on said push member and contacting with said tool holder to project said tool holder from the body upon the rotation of said shaft and sliding movement of said push member, a stop operable to release said dogs upon a predetermined amount of projection of said tool holder from said body, and a spring for retracting said tool holder after release of the connection with said push member.

2. A feed head comprising a sleeve fixed to a rotating shaft, a fixed member and a push member mounted on said sleeve, a plurality of centrifugally actuated weights disposed between said members concentrically of said sleeve and movable outwardly thereof and relative to said members upon rotation of the sleeve thereby to move said push member axially thereof, a tool holding member carried by said sleeve and slidable relative thereto, means carried by said push member and engaging said tool holder for projecting said tool holder outwardly from said sleeve, a member for releasing the connection between said push member and said tool holder after projection of said tool holder to a predetermined point, and a spring for thereafter retracting said tool holder.

3. A feed head comprising a housing, a rotatable shaft mounted therein, a tool holder secured to said shaft for rotation therewith and axial movement relative thereto, a spring for yieldingly maintaining said tool holder in normal retracted position relative to said shaft, a fixed member on said shaft and an opposed push member mounted on said shaft adjacent thereto and movable axially of said shaft, a plurality of centrifugally actuated members surrounding said shaft and maintained between said fixed member and said push member, a spring yieldingly maintaining an intimate contact between said fixed member, said push member and said centrifugally actuated members, a releasable connection between said push member and said tool holder, and means for releasing said connection upon axial movement of said tool holder to a predetermined point.

4. A feed head adapted to move a tool rotating at a substantially constant rate and at a predetermined pressure towards a work piece and comprising a power driven rotating shaft, a sleeve secured to said shaft, a tool holding member slidable longitudinally inside said sleeve and secured thereto for rotation therewith, a plurality of centrifugally actuated weight members disposed about said sleeve, a fixed member secured to said sleeve adjacent one end of said weights, a push member slidably mounted on said sleeve adjacent the other end of said weights, and a releasable connecting member carried by said push member and contacting with a stop on said tool holding member to effect sliding movement thereof relative to said sleeve upon movement of said push member, a release member for releasing said connecting member, and a spring for returning said tool holder after release of said connection.

5. A feed head for feeding a rotating tool into a work piece, comprising an axially movable rotating tool holder, radially movable weights mounted to be revolved around an axis and connected to move the tool holder toward the work piece as the weights move outwardly from the axis, means to rotate the tool and revolve the weights, and a compression spring interposed between the tool holder and the radially movable weights and adapted to oppose the outward movement of the weights and substantially to balance by an increase in the opposed forces exerted by said spring the increase in the centrifugal forces developed in said weights, said spring being relatively shorter than the stroke of the tool whereby the increase in the resisting forces of the spring due to axial movement of the tool holder is substantially equal in rate and amount to the increase in the impelling centrifugal forces due to lengthening of the radius of the revolution of said weights.

6. A feed head adapted to move a tool rotating at a substantially constant rate and at a predetermined pressure towards a work piece and comprising a power driven rotating shaft, a sleeve secured to said shaft, a tool holding member slidable longitudinally inside said sleeve and secured thereto for rotation therewith, a plurality of centrifugally actuated weight members disposed about said sleeve, a fixed member secured to said sleeve adjacent one end of said weights, a pusher member slidably mounted on said sleeve adjacent the other end of said weights, means connecting said pusher member to said tool holding member, and a spring opposing the movement of said pusher member under the force of the centrifugal weights, said spring being adapted to be stressed by the increase in the forces exerted by the outward movement of the centrifugal weights thereby substantially to balance the increase of the said forces and maintain the predetermined pressure on the tool.

7. In a device for automatically feeding a rotating tool to a work piece at a predetermined rate and pressure and for a predetermined distance, a plurality of weight members drivingly connected with a rotatable tool driving spindle and adapted to be moved outwardly radially of the longitudinal axis of said spindle by the centrifugal force developed by rotation of said members, said radial movement of said members being adapted to produce a component force acting along the axis of rotation of said tool spindle to feed said tool spindle toward said work piece, an adjustable release member adapted to disengage the driving connection between said weight members and said tool spindle upon a predetermined movement thereof, and a resilient member acting on said weights to regulate the rate of outward movement thereof and the pressure exerted on said tool spindle and to return said weights to their original positions after feeding the tool spindle a predetermined distance toward the work piece.

CLAUDE E. BRODERS.